United States Patent [19]

Bair

[11] Patent Number: 5,758,543

[45] Date of Patent: Jun. 2, 1998

[54] SHIFT LEVER ASSEMBLY FOR MINIMIZING JUMPOUT

[75] Inventor: John J. Bair, Plainwell, Mich.

[73] Assignee: Eaton Corporation, Cleveland, Ohio

[21] Appl. No.: 646,225

[22] Filed: May 6, 1996

[51] Int. Cl.$^6$ .............................. G05G 9/00; B60K 20/04
[52] U.S. Cl. ........................................................ 74/473 R
[58] Field of Search ............................. 74/473 R, 491, 74/523

[56]  References Cited

U.S. PATENT DOCUMENTS

| | | |
|---|---|---|
| 3,926,068 | 12/1975 | Jantzen et al. ............... 74/473 R |
| 4,455,883 | 6/1984 | Radcliffe . |
| 4,483,211 | 11/1984 | Hurlow ......................... 74/473 R |
| 4,515,032 | 5/1985 | Olmstead ...................... 74/473 R |
| 4,550,627 | 11/1985 | Lauer et al. . |
| 4,920,815 | 5/1990 | Reynolds . |
| 5,000,060 | 3/1991 | Reynolds et al. . |
| 5,137,106 | 8/1992 | Allen et al. ................ 74/473 R X |
| 5,272,931 | 12/1993 | Daniel . |
| 5,281,902 | 1/1994 | Edelen . |
| 5,390,561 | 2/1995 | Stine . |

*Primary Examiner*—Rodney H. Bonck
*Assistant Examiner*—Troy Grabow
*Attorney, Agent, or Firm*—Howard D. Gordon

[57]  ABSTRACT

A directly mounted shift lever assembly (30) for a manually shifted vehicular transmission (16) for minimizing shift lever-induced jumpout. A counterweight (52) is mounted to the shift lever (31) in a forwardly extending manner to move the center of gravity (CG) of the resultant shift lever assembly forward of the shift lever Y—Y pivot axis (34).

4 Claims, 4 Drawing Sheets

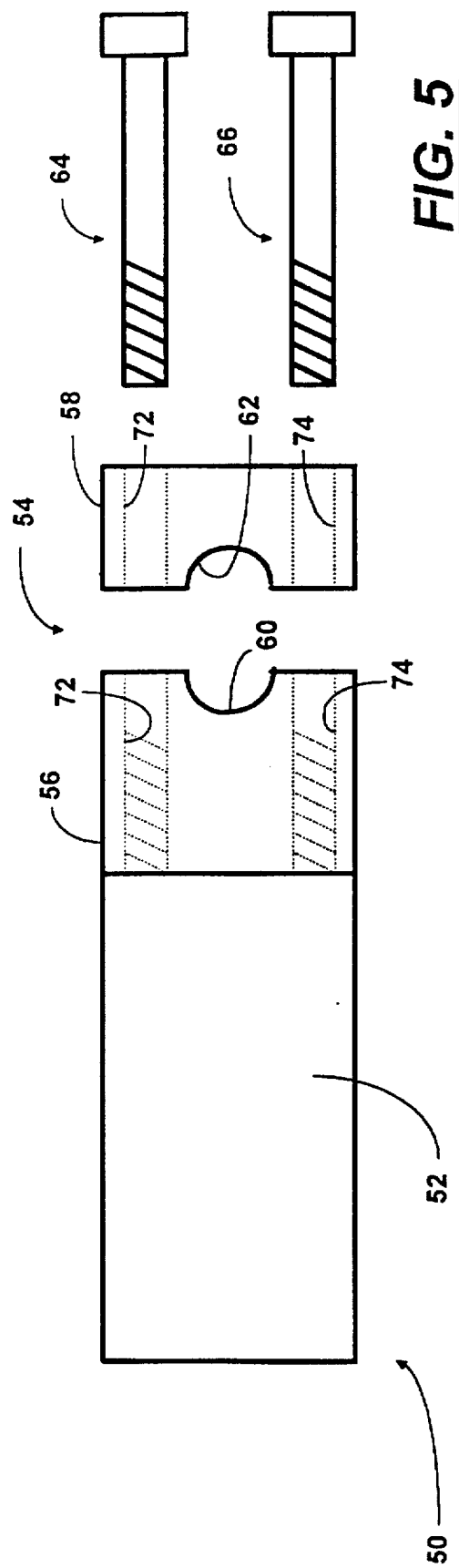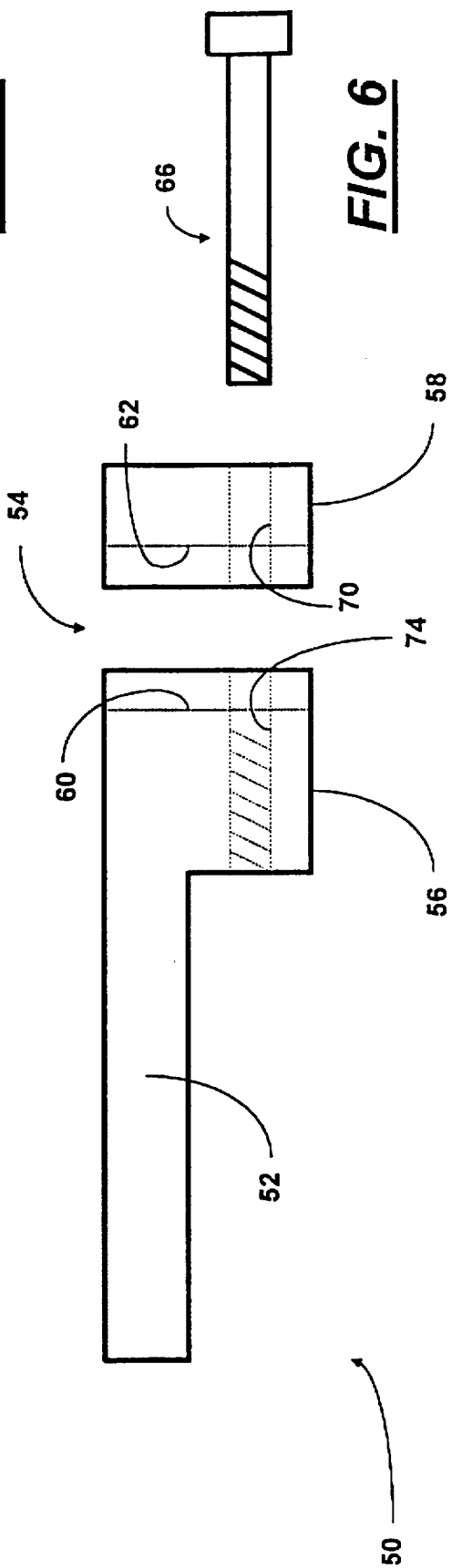

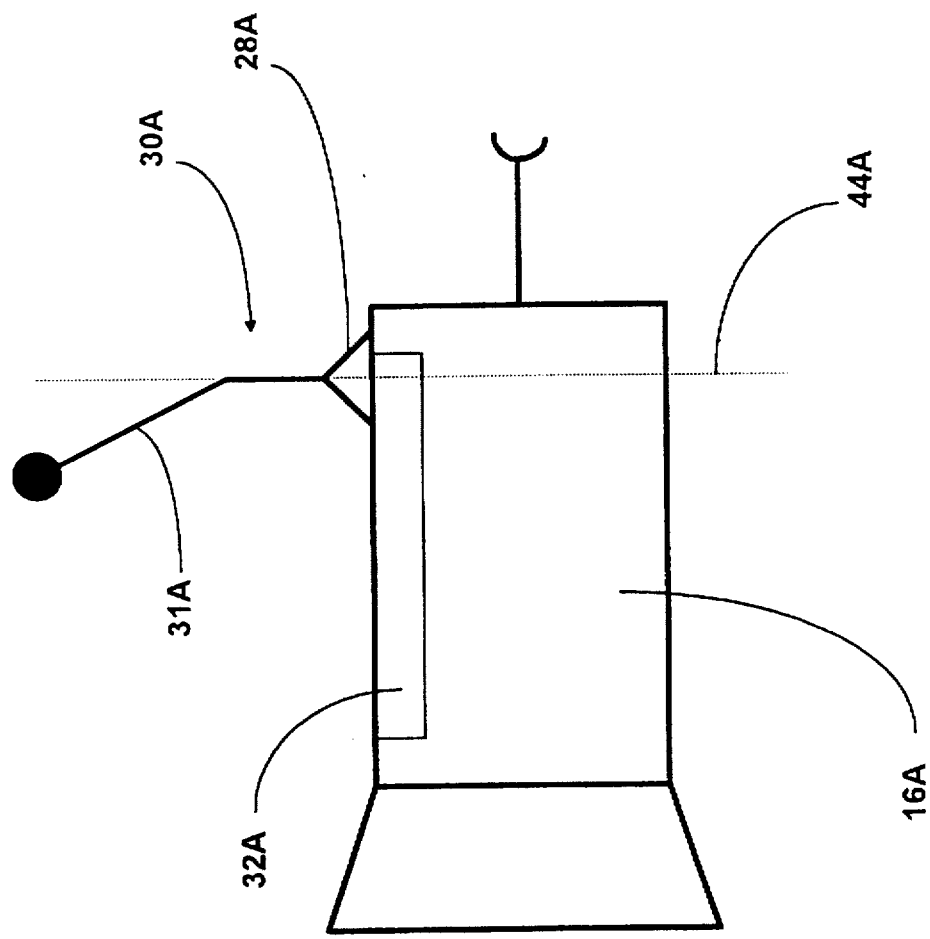

5,758,543

SHIFT LEVER ASSEMBLY FOR MINIMIZING JUMPOUT

BACKGROUND OF THE INVENTION

1. Field of the Invention

The present invention relates to shift lever assemblies for manually shifted vehicular transmissions and, in particular, to shift lever assemblies for manually shifting vehicular transmissions which are specially configured to move the center of gravity of the assembly forward of the pivot axis of the shift lever to minimize the occurrence of shift lever-induced jumpout.

2. Description of the Prior Art

Manually shifted vehicular transmissions of the simple and/or compound types and of the synchronized, blocked and/or non-synchronized types are well known in the prior art, as may be seen by reference to U.S. Pat. Nos. 5,000,060 and 5,390,561, the disclosures of which are incorporated herein by reference.

The prior art manually shifted transmissions, especially as utilized for heavy-duty vehicles such as straight trucks and conventional (i.e., not cab-over-engine) tractor/semi-trailers, utilized a manually manipulated shift lever extending upwardly from a shift tower subassembly mounted directly on the transmission housing and interacting with a multiple-rail or single shift shaft shifting mechanism of the types shown in U.S. Pat. Nos. 4,455,883; 4,550,627; 4,920,815 and 5,272,931, the disclosures of which are incorporated herein by reference.

While such transmissions are widely used and commercially successful, they are not totally satisfactory, as under certain severe road conditions, the transmissions may experience shift lever-induced jumpout (i.e., unintended disengagement of a gear ratio). This situation usually is associated with transmissions utilized in relatively heavy-duty vehicles (i.e., such as MVMA Class 5 and larger vehicles), which tend to have relatively long shift levers having relatively large shift knobs, often including master valving for controlling range and/or splitter shifts, at the ends thereof.

SUMMARY OF THE INVENTION

In accordance with the present invention, the drawbacks of the prior art are minimized or overcome by the provision of a shift lever assembly for a manually shifted vehicular transmission having a directly mounted shift lever which will minimize or eliminate the occurrences of shift lever-induced jumpout.

The foregoing is accomplished by the provision of a shift lever assembly for manually shifted transmissions having directly mounted shift levers which are configured to offset the center of gravity of the assemblies forward of the shift lever engagement (Y—Y) pivot axis. In one preferred embodiment, a forwardly extending counterweight is fixedly cantilever-mounted to the shift lever. Accordingly, it is an object of the present invention to provide a new and improved directly mounted shift lever assembly for manually shifted transmissions which will minimize shift lever whip-induced jumpout.

This and other objects and advantages of the present invention will become apparent from a reading of the following description of the preferred embodiment taken in connection with the attached drawings.

BRIEF DESCRIPTION OF THE DRAWINGS

FIG. 5 is an exploded top view of a counterweight assembly for use in the shift lever assembly of the present invention.

FIG. 6 is a side view of the counterweight assembly of FIG. 5.

FIG. 7 is a schematic illustration of an alternate embodiment of the present invention.

DESCRIPTION OF THE PREFERRED EMBODIMENT

Figure 1:
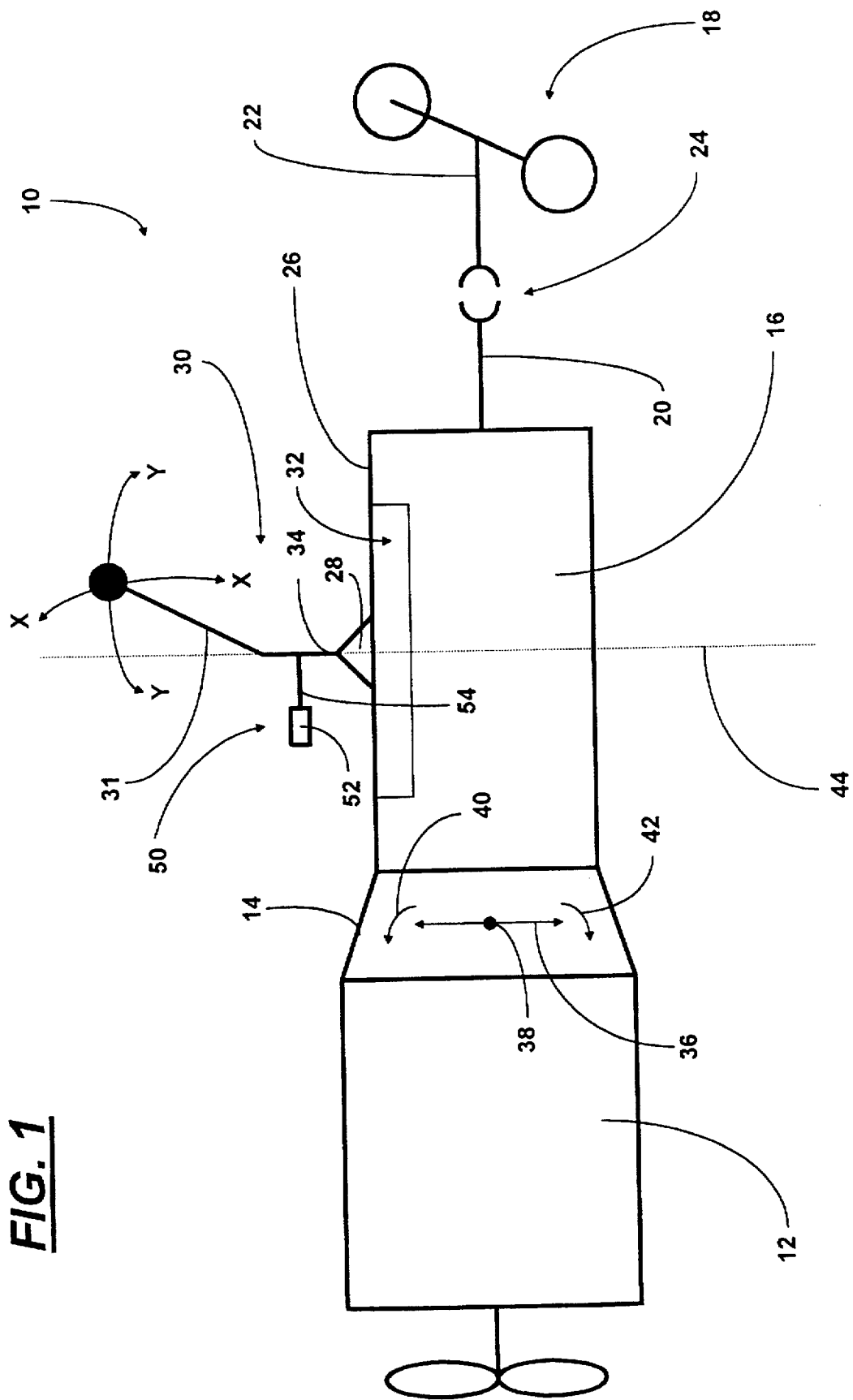
FIG. 1 is a symbolic representation of a vehicular drive line utilizing the improved shift lever assembly of the present invention.

Certain terminology will be used in the following description of the preferred embodiment for convenience only and will not be limiting. The terms "upward," "downward," "rightward" and "leftward" will designate directions in the directions to which reference is made. The terms "forward" and "rearward" will refer, respectively, to the front and rear ends of the drive train components as conventionally mounted in the vehicle, being, respectively, to the left and right sides of the various drive train components, as illustrated in FIG. 1. The terms "clockwise" and "counterclockwise" will refer to rotational directions as viewed from the left side of the vehicle, as shown in FIG. 1. Said terminology includes the words above specifically mentioned, derivatives thereof and words of similar import.

A typical vehicular powertrain system 10 utilizing the shift lever assembly of the present invention may be seen by reference to FIG. 1. Powertrain 10 is of the type commonly utilized in heavy-duty vehicles, such as the conventional tractors of tractor/semi-trailer vehicles, and includes an engine, typically a diesel engine, 12, a master friction clutch 14 contained within a clutch housing, a multiple-speed compound transmission 16, and a drive axle assembly 18. The transmission 16 includes an output shaft 20 drivingly coupled to a vehicle drive shaft 22 by a universal joint 24 for driving the drive axle assembly, as is well known in the prior art. The transmission 16 is housed within a transmission housing 26 to which is directly mounted the shift tower 28 of the shift lever assembly 30 of the present invention.

Figure 4:
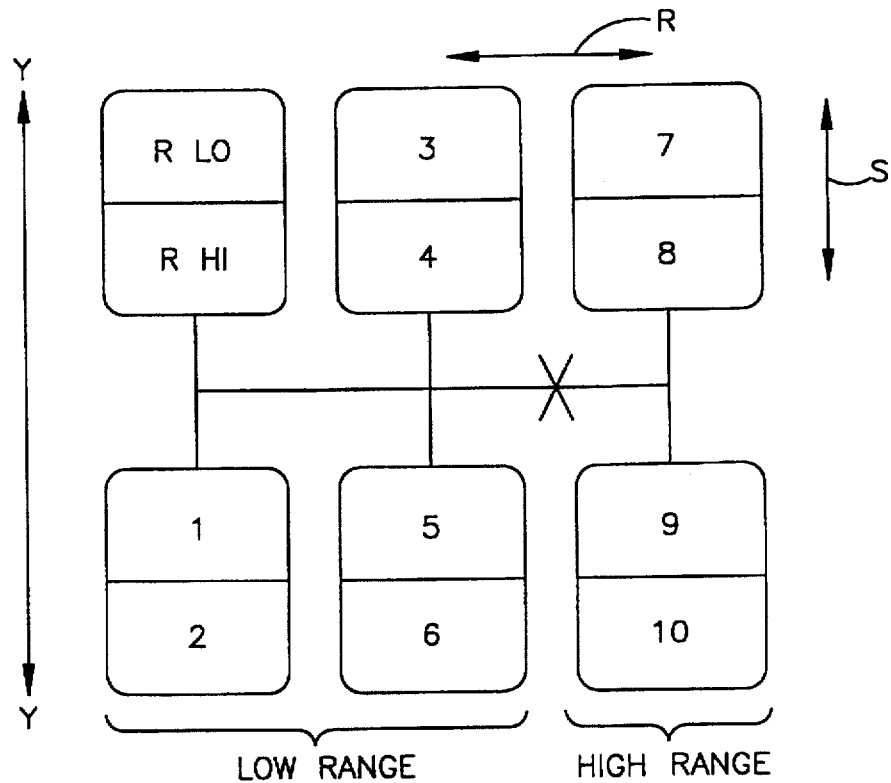
FIG. 4 is a symbolic representation of a typical shift pattern for a heavy-duty, manually shifted transmission of the type advantageously utilizing the present invention.

FIG. 4 illustrates a typical shift pattern for a combined range-and-splitter-type compound transmission manually shifted by a manually operated shift lever. Briefly, the shift lever is movable in the side-to-side or X—X direction to select a particular ratio or ratios to be engaged and is movable in the fore and aft or Y—Y direction to selectively engage and disengage the various ratios. The shift pattern may include an automatic range shifting feature and manual splitter shifting, as is well known in the prior art. Transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like that shown) extending downwardly into a shifting mechanism 32, such as multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the prior art transmissions of the general type illustrated in FIG. 1 but not incorporating the improved shift lever assembly of the present invention, it is known that annoying shift lever jumpout may occur if road conditions are severe. Briefly, shift lever jumpout is the unintended disengagement of the jaw clutches of a manually shifted transmission caused by shift lever oscillations in the Y—Y direction about the Y—Y pivot axis 34 of the shift lever assembly, it is the purpose of the shift lever assembly of the present invention to minimize the occurrences of such shift lever-induced jumpout.

Figure 2:
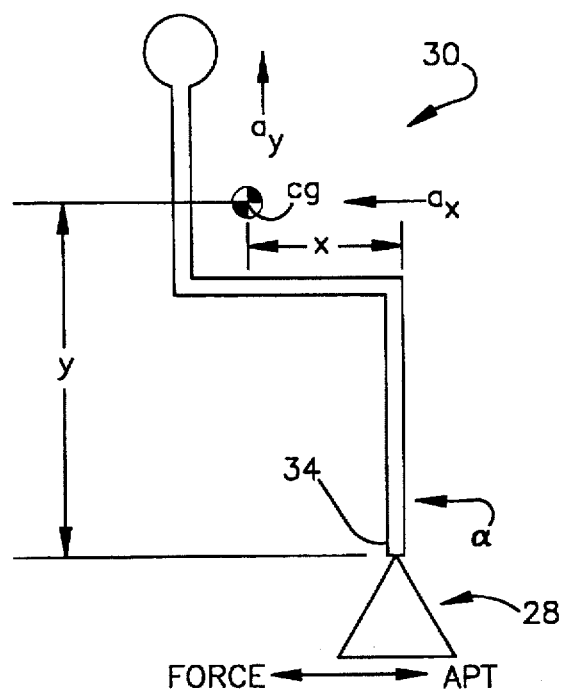
FIG. 2 is a symbolic illustration of the parameters affecting shift lever-induced jumpout torque.
Figure 3:
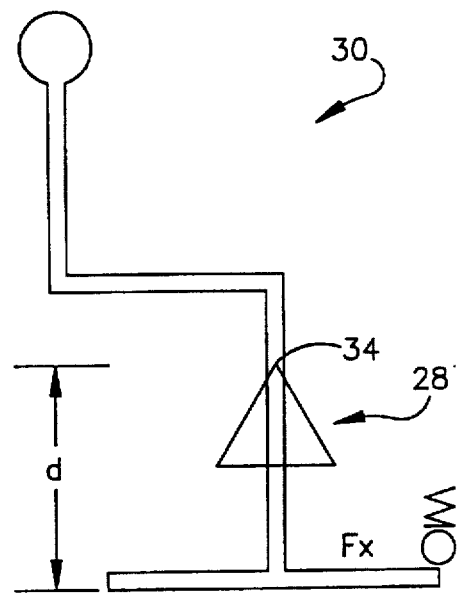
FIG. 3 is a symbolic illustration of the parameters affecting detent torque.

Referring to FIG. 1, in a typical heavy-duty vehicle powertrain, the engine-clutch-transmission assemblage will tend to move, during severe road conditions, in a vertical manner (as illustrated by arrow 36) and in a pivoting manner about a pivot point or axis 38 (usually located in the area of the vehicle clutch). As is indicated by arrow 40, an upward movement of the assemblage almost always is associated with a counterclockwise rotation of the assemblage around pivot axis 38, while, as indicated by arrow 42, a downward movement of the assemblage almost always is accompanied by a clockwise rotation of the assemblage about the pivot axis 38. As understood, shift lever-induced jumpout is forced by the inertial effects of excessive road-induced vibration in the vehicle drive train. This road-induced shock causes the engine-clutch-transmission assemblage to pitch on its mounts, as shown in FIG. 1. This pitching occurs at the natural frequency of the engine-clutch-transmission-mount system, usually between about 7 and 10 HZ. This pitching induces relatively high vertical, fore-aft and rotational accelerations on the transmission and, in particular, the shift lever assembly. The shift lever assembly then develops an inertial jumpout torque $T_J$ about its pivot 34 as determined by the sum of the inertial torques thereon, as will be described in greater detail below and as schematically illustrated in FIG. 2. It is noted that the typical rearward offset in transmission lever tends to increase the jumpout torque, whereas a forward offset tends to reduce jumpout torque As will be described in greater detail below and as is schematically illustrated in FIG. 3, jumpout torque $T_J$ is resisted by the shift rail or shift shaft detent force multiplied by its moment arm determined by the distance between the pivot 34 and the shift rail or shaft (i.e., detent torque $T_O$). When the jumpout torque overcomes the detent torque, jumpout occurs. Detent force Fx may include the forces required to overcome a detent mechanism, torque lock in the engaged jaw clutches, and frictional forces in the shift mechanism. When the jumpout torque overcomes the detent torque, shift lever jumpout occurs. This tends to occur when the drive train has a very low torque, such as vehicle coast conditions, since the friction from so-called torque lock in the drive train during driving conditions tends to lock the engaged sliding clutch members in engagement and greatly overcomes any jumpout forces imposed thereon.

As the shift lever assembly 30 itself is a dynamic system, it has its own natural frequency. Unfortunately, this also usually occurs between 7 and 10 HZ. This frequency is determined by lever height, lever offset, tower height, and isolator stiffness. If the natural frequency of the engine-clutch-transmission assemblage matches that of the shift lever assembly, propensity for jumpout is greater because the engine-amplified inertial forces are amplified further by the lever resonance.

In FIG. 2, $$T_J = a_X My - a_Y Mx + I\alpha$$

where:

$T_J$ = Jumpout torque
M = Mass of lever
I = Moment of inertia of lever
$a_X$ = Fore/aft acceleration
$a_Y$ = Vertical acceleration
$\alpha$ = Angular acceleration of lever
x = Distance between cg of lever and pivot
y = Vertical distance between cg of lever and pivot
cg = Center of gravity while in FIG. 3, $$T_O = F_X d$$

where $T_O$ = Detent torque
$F_X$ = Detent force
d = Distance between pivot and rail.

FIG. 2 illustrates a mathematical model for calculating the jumpout torque $T_J$ induced by shift lever whip. It is noted that jumpout torque will be applied in both the counterclockwise and clockwise directions about the shift lever pivot axis 34 but will tend to cause jumpout only in one of those two directions, depending upon the currently engaged gear ratio. In carefully studying this mathematical model, it may be seen that if the center of gravity (CG) of the shift lever assembly 30 is offset forward of the pivot point 34, then the upward vertical acceleration $a_Y$ of the shift lever assembly will produce a torque $a_Y Mx$ tending to counteract the torque resulting from the expected counterclockwise rotation of the shift lever assembly ($I\alpha$). Conversely, the torque resulting from downward acceleration of the shift lever assembly will produce a torque tending to counteract the torque resulting from a clockwise rotation of the shift lever assembly. Accordingly, Applicant has determined that the total jumpout torque $T_J$ resulting from shift lever oscillations due to the pitching of the engine-clutch-transmission assemblage may be reduced if the shift lever assembly is modified from its typical configuration such that the center of gravity of the shift lever assembly is offset in the forward direction from a plane 44 generally perpendicular to the axes of the output shaft 20 and containing the pivot axis 34 of the shift lever assembly. Similarly, any modification to the shift lever assembly which increases the forward offset of its center of gravity forwardly, even minimizing the rearward offset of the center of gravity, will tend to minimize the occurrences of shift lever-induced jumpout.

Applicant has discovered that due to the tendency of the engine-clutch-transmission assemblage to rotate in a generally counterclockwise manner during upward vertical movements and to rotate in a generally clockwise manner during downward vertical movements about the pivot axis 38 of the assemblage, the inertial torque due to the vertical acceleration from road-induced vibration $a_Y Mx$ will tend to counteract the dominating torque ($I\alpha$) due to rotational acceleration, resulting in a much lower total jumpout torque about the pivot point. One method to accomplish this (see FIG. 7) would be to design the transmission 16A such that the shift tower 28A is moved rearwardly on the transmission such that the shift lever assembly 38 utilizes a shift lever 31 bent forwardly, which will tend to move the center of gravity thereof forwardly of a plane 44A containing the pivot axis of the shift lever. For many vehicle configurations, this solution may not be practical due to the layout of existing vehicles and the structure of existing shift mechanisms 32A.

In FIGS. 1, 5 and 6; a preferred form of the present invention is illustrated, which is well suited for most, if not all, existing transmission and vehicle configurations and is well suited for retrofitting existing shift lever assemblies. In this preferred embodiment, a counterweight assembly 50 comprising a mass 52 fixedly cantilever-mounted to the existing shift lever 31 by a mounting means 54 which will extend the mass forwardly of the plane 44 is provided. The mass of the counterweight member 52 and the length of the cantilever mounting means 54 is selected such that the center of gravity of the resulting shift lever assembly 30 will be such that the torque resulting from vertical accelerations will tend to counteract the torque resulting from pivotal accelerations. Referring to FIG. 2, this will provide best results in a situation where the length and mass are selected such that the resulting torque due to shift lever vertical acceleration, $a_y Mx$, will be generally equal to and opposed to the torque due to shift lever angular acceleration, $I\alpha$.

FIGS. 5 and 6 show the structure of the counterweight assembly 50. Briefly, the mass 52 is attached to the mounting means 54, which comprises two separable pieces 56 and 58 defining aligned, cooperating, generally concave cavities 60 and 62, respectively, for clamping receipt of the shift lever 31 therebetween. A plurality of threaded fasteners, such as bolts 64 and 66, are provided for passage through through bores 68 and 70 and threaded receipt in the interior threaded bores 72 and 74. The mass 52 may be of a highly dense material and/or may have selectively variable inserts to vary the mass thereof.

Accordingly, it may be seen that a new and improved shift lever assembly for manually shifted transmissions, especially manually shifted transmissions for heavy-duty vehicles, is provided which will minimize or eliminate the occurrences of shift lever-induced jumpout.

Although the present invention has been described with a certain degree of particularity, it is understood that the description of the preferred embodiment is by way of example only and that numerous changes to form and detail are possible without departing from the spirit and scope of the invention as hereinafter claimed

I claim:

1. A shift lever assembly (30) for reducing shift lever-induced jumpout in a manually shifted transmission system comprising:

a shift lever subassembly (31) associated with a manually shifted vehicular transmission having an output shaft, said shift lever subassembly comprising an elongated shift lever having a shift knob at one end thereof and pivotably mounted about a pivot axis defined in a shift tower mounted directly to the transmission for generally fore-and-aft pivotable movement to selectively engage and disengage selected transmission ratios, said shift lever subassembly having a center of gravity located rearwardly of a plane (44) containing said pivot axis and perpendicular to the axis of said output shaft; and a counterweight (50) attachable to said shift lever at a location intermediate said shift knob and said pivot axis and including a forwardly extending mass, said counterweight and said shift lever subassembly forming a resultant shift lever assembly (30), said mass being of sufficient magnitude and of sufficient forward extension to offset the center of gravity of said resultant shift lever assembly to a position forward of said plane.

2. The assembly of claim 1 wherein said counterweight is removably attached to said shift lever.

3. The assembly of claim 1 wherein said mass is selected to provide a resultant shift lever assembly center of gravity which will reduce the value of the expression $I\alpha - a_y Mx$ where:

I=moment-of-inertia of shift lever assembly;

$\alpha$=angular acceleration of shift lever assembly in counterclockwise direction about said pivot axis;

$a_y$=vertical upward acceleration;

M=mass of shift lever assembly; and x=distance between center of gravity and said plane.

4. A method for providing a shift lever assembly (30) for a manually shifted vehicular transmission having an output shaft, said shift lever assembly comprising an elongated shift lever (31) having a shift knob at one end thereof and pivotably mounted about a pivot axis defined in a shift tower mounted directly to the transmission for generally fore-and-aft pivotable movement to selectively engage and disengage selected transmission ratios, said shift lever assembly is considered to be subjected to vertical accelerations ($a_y$) and angular acclerations about said pivot axis ($\alpha$), which are related in a known manner, said method comprising:

providing a mass (50) extending forwardly from said shift lever from a position intermediate said shift knob and said pivot axis for offsetting the center of gravity of said shift lever assembly forwardly of a plane (44) containing said pivot axis and perpendicular to the axis of said output shaft, said mass selected to provide a shift lever assembly center of gravity which will reduce the value of the expression $I\alpha - a_y Mx$ where:

I=moment-of-inertia of shift lever assembly;

$\alpha$=angular acceleration of shift lever assembly in counterclockwise direction about said pivot axis;

$a_y$=vertical upward acceleration;

M=mass of shift lever assembly; and x=distance between center of gravity and said plane.

\* \* \* \* \*